US011611582B2

(12) United States Patent
Pryce et al.

(10) Patent No.: US 11,611,582 B2
(45) Date of Patent: Mar. 21, 2023

(54) DYNAMIC PHISHING DETECTION

(71) Applicant: WANDERA LTD., London (GB)

(72) Inventors: David Pryce, London (GB); Zdenek Letko, Brno (CZ)

(73) Assignee: WANDERA LTD., London (GB)

( * ) Notice: Subject to any disclaimer, the term of this patent is extended or adjusted under 35 U.S.C. 154(b) by 394 days.

(21) Appl. No.: 16/452,318

(22) Filed: Jun. 25, 2019

(65) Prior Publication Data
US 2019/0394235 A1 Dec. 26, 2019

(30) Foreign Application Priority Data
Jun. 26, 2018 (GB) ..................................... 1810483

(51) Int. Cl.
*H04L 9/40* (2022.01)
*G06F 16/955* (2019.01)
*G06F 17/18* (2006.01)
*G06K 9/62* (2022.01)

(52) U.S. Cl.
CPC ........ *H04L 63/1483* (2013.01); *G06F 16/955* (2019.01); *G06F 17/18* (2013.01); *G06K 9/6267* (2013.01)

(58) Field of Classification Search
CPC .................................................. H04L 63/1483
See application file for complete search history.

(56) References Cited

U.S. PATENT DOCUMENTS

| 5,751,956 | A | * | 5/1998 | Kirsch | H04L 12/1471 709/203 |
| 9,762,612 | B1 | * | 9/2017 | Schiffman | H04L 41/0631 |
| 2005/0108569 | A1 | * | 5/2005 | Bantz | H04L 63/1483 726/4 |

(Continued)

FOREIGN PATENT DOCUMENTS

GB          2575052 A   *   1/2020   ........... G06F 16/955

OTHER PUBLICATIONS

Weedon et al., "Random Forest Explorations For URL Classification", 2017 International Conference On Cyber Situational Awareness, Data Analytics And Assessment (Cyber SA), published Jun. 19, 2017, IEEE. Available from: https://ieeexplore.ieee.org/document/8073403 accessed Nov. 29, 2018, 4 pages.

(Continued)

*Primary Examiner* — Ponnoreay Pich
(74) *Attorney, Agent, or Firm* — Benesch, Friedlander, Coplan & Aronoff LLP

(57) ABSTRACT

A computer implemented method of detecting a phishing threat using a pre-defined statistical model to determine whether a network resource is a potential phishing threat based on features extracted from a network resource identifier for the network resource. The method includes: receiving a request to access a network resource; determining, from the request, a network resource identifier for the requested network resource; extracting one or more features from the network resource identifier; applying the pre-defined statistical model to the extracted features; and clas- (Continued)

sifying the network resource as a phishing threat if the output of the statistical model, when applied to the extracted features, determines that the network resource is a potential phishing threat.

18 Claims, 1 Drawing Sheet

(56) References Cited

U.S. PATENT DOCUMENTS

| | | | |
|---|---|---|---|
| 2006/0041508 A1* | 2/2006 | Pham | H04L 63/1433 705/50 |
| 2006/0069697 A1* | 3/2006 | Shraim | H04L 63/1483 707/999.102 |
| 2006/0080437 A1* | 4/2006 | Lake | G06F 16/9558 709/225 |
| 2006/0080735 A1* | 4/2006 | Brinson | H04L 63/1483 726/22 |
| 2006/0123464 A1* | 6/2006 | Goodman | H04L 63/1466 726/2 |
| 2006/0174119 A1* | 8/2006 | Xu | H04L 63/1483 713/170 |
| 2006/0253446 A1* | 11/2006 | Leong | H04L 63/1441 |
| 2006/0253458 A1* | 11/2006 | Dixon | H04L 63/101 |
| 2007/0192855 A1* | 8/2007 | Hulten | H04L 63/1483 707/E17.115 |
| 2007/0245422 A1* | 10/2007 | Hwang | H04L 63/1483 726/26 |
| 2008/0147837 A1* | 6/2008 | Klein | H04L 63/1483 709/223 |
| 2012/0158626 A1* | 6/2012 | Zhu | H04L 63/1408 706/13 |
| 2019/0394235 A1* | 12/2019 | Pryce | G06F 17/18 |

OTHER PUBLICATIONS

Thaker et al., "Detecting Phishing Websites using Data Mining", 2018 Second International Conference on Electronics, Communication and Aerospace Technology (ICECA), published Mar. 29, 2018, IEEE. Available from :https://ieeexplore.ieee.org/document/8474820 accessed Nov. 29, 2018, pp. 1876-1879.

* cited by examiner

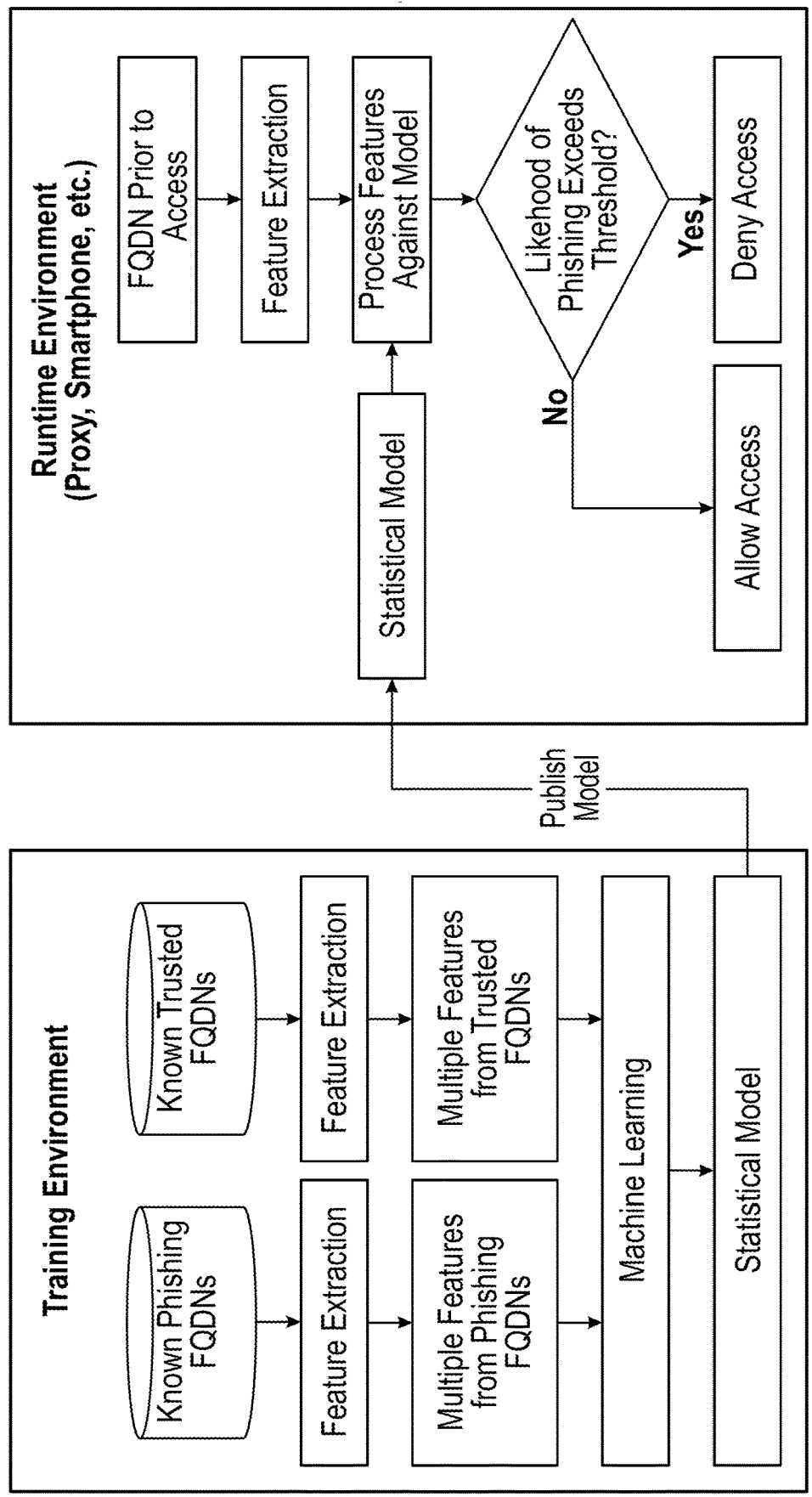

DYNAMIC PHISHING DETECTION

CROSS-REFERENCE TO RELATED APPLICATIONS

The present application claims priority to United Kingdom Patent Application No. 1810483.6, filed on Jun. 26, 2018, the disclosure of which is hereby incorporated by reference in its entirety for all purposes.

BACKGROUND

Technical Field

The present disclosure relates to methods and systems for detecting phishing.

Description of the Related Art

Phishing is the attempt to obtain sensitive information such as usernames, passwords, and credit card details (and money), often for malicious reasons, by disguising as a trustworthy entity in an electronic communication.

Phishing is a particularly significant risk with mobile devices as the typically smaller screen size makes it easier for a malicious entity to disguise itself as a trustworthy entity.

Previous phishing detection solutions have relied on the production and distribution of lists of known phishing websites or URLs. This approach is problematic since phishing websites are typically ephemeral and short lived; there is therefore a significant period of exposure between the time a new phishing website comes into existence, and the time that it is identified, added to the list, and deployed as protection to end-user devices. In some cases, the phishing website may never be discovered by a list maintainer, so no protection is ever provided.

BRIEF SUMMARY

Embodiments of the present disclosure propose using a statistical model, especially statistical models that have been derived/trained using machine learning algorithms, to classify network resources (e.g., websites/webpages) as malicious (or non-malicious) based on features extracted from a network resource identifier, for example from a URL, generally from the FQDN portion of the URL. This approach avoids the need for distributing lists of known phishing websites (or other network resources). New phishing threats can be immediately detected.

In general terms, embodiments of the disclosure can be implemented in at least two types of scenario:
  i—runtime analysis of individual network resource identifiers dynamically extracted from network requests; and
  ii—analysis of a single network resource identifier or a batch of two or more network resource identifiers, for example from a database or datafeed of network resource identifiers.

In one aspect the disclosure provides a method of detecting a phishing threat, the method using a pre-defined statistical model to determine whether a network resource is a potential phishing threat based on features extracted from a network resource identifier for the network resource, the method comprising:

receiving a request to access a network resource;
  determining, from the request, a network resource identifier for the requested network resource;
  extracting one or more features from the network resource identifier;
  applying the pre-defined statistical model to the extracted features; and
  classifying the network resource as a phishing threat if the output of the statistical model, when applied to the extracted features, determines that the network resource is a potential phishing threat.

Preferably, if a potential phishing threat is identified, access to the requested network resource is prevented.

In some embodiments, the network resource may be a website or webpage, or any other resource accessible on a network.

The request to access the network resource may take any of a number of forms. In some embodiments it may be a webpage request, a DNS request, a call to a database, a data feed, etc.

In some embodiments, the request may be originated from an app, application or an operating system process, for example, executing on a computing device. The computing device may, for example, be an end user device (e.g., a smart phone, tablet, laptop, PC or set-top box), a server computer or another network-connected device. The request may be initiated by user input or automatically by a process running on the computing device.

In some embodiments, the network resource identifier is not extracted directly from a network request, but may instead be obtained (either individually or in conjunction with a plurality of other network identifiers) from a database or datafeed of network resource identifiers, which has itself been populated using one or a multiplicity of techniques, for example as a history or aggregated history of prior network requests, or registrations of network resource identifiers (e.g., domain registrations, certificate registrations) or network resource identifiers which are associated with or derived from entities contained within other databases or datafeeds. In situations where multiple network resource identifiers are simultaneously available for classification, the process of feature extraction, applying the pre-defined statistical model and classifying as a phishing threat (or not) may be optimized to execute in parallel and provide results more quickly.

Accordingly, in a second aspect the disclosure provides a method of determining whether one or more network resources are phishing threats, the or each network resource having an associated network resource identifier, the method using a pre-defined statistical model to determine whether a network resource is a potential phishing threat based on features extracted from the network resource identifier, the method comprising:

receiving one or more network resource identifiers;
  extracting one or more features from the or each network resource identifier;
  applying the pre-defined statistical model to the extracted features; and
  for each network resource identifier, classifying the associated network resource as a phishing threat if the output of the statistical model, when applied to the extracted features, determines that the network resource is a potential phishing threat.

In this aspect, the one or more network resource identifiers may, for example, be obtained from a database of network resource identifiers or a datafeed of network resource identifiers. The network resource identifiers may be received individually or in batches or two or more.

Some embodiments of the disclosure may be implemented as a network service that can be called by other network services or devices and used to classify a network resource identifier (passed to the service by the other service/device) as malicious (i.e., a phishing threat) or not. For example, embodiments of the disclosure may run within a filter service that can be called from proxies, dns servers, etc.

In some embodiments, the one or more network resource identifiers may be obtained indirectly from other characteristics of the network resources, the network identifiers being determined (e.g., from one or more lookups) based on the other characteristics.

In some embodiments of the various aspects of the disclosure, the network resource identifier may be a domain name (e.g., an FQDN), a URI (e.g., a URL) or other identifier that identifies and/or locates a resource on a network. The network resource identifier may be determined in some embodiments by extracting the network identifier directly from the request. In other embodiments, the network resource identifier may be determined by deriving the identifier indirectly from the request by using information in the request to lookup the identifier using one or more lookups. For example, in the case where a request to access a network resource includes a network address (e.g., IP address) for the resource, the network resource identifier can be looked up using the network address (e.g., a reverse DNS lookup from an IP address).

The statistical model may use any suitable feature or combination of features from the network resource identifier. The extracted features used by the model may be extracted directly or indirectly from the network resource identifier.

In some embodiments, the features are taken from an FQDN (fully qualified domain name) as it has been found that FQDN features can be used reliably to spot phishing threats. For example, FQDNs for phishing websites often contain the domain of a true domain they are seeking to target but in a position other than the second-level domain. Various other characteristics of the FQDNs of phishing websites (or other network resources) can be deduced and used within the model to classify the resource associated with an FQDN as a phishing threat (or not).

In other embodiments, features may additionally or alternatively be obtained from other direct aspects of the access to the resource, including but not limited to: other components of a URL for the resource (e.g., path and/or query string).

In other embodiments, features may additionally or alternatively be obtained indirectly from the network resource identifier, for example based on secondary aspects of the access to the resource, including domain registration information ("whois" response, registry details, registrant details, registration time/date/day-of-week), IP address or addresses associated with the domain, geolocation of IP address or addresses associated with the domain, etc.

For reliably predicting whether or not network resource (e.g., webpage) identified by an FQDN (or more generally a network resource identifier) should be classified as a phishing threat, a set of at least one or more, preferably three or more, more preferably five or more, and even more preferably 10 or more features of the FQDN (and/or other network resource identifier) should be used.

In some embodiments, the model operates to determine the probability that a network resource (e.g., webpage) is a phishing threat and determines that the resource is a potential phishing threat when the probability exceeds a predetermined threshold. The threshold may be set, for example, by a user or system administrator. The level set may be chosen to reflect the level of risk that the user or their organization is prepared to accept and/or the likely seriousness of the consequences of a phishing attack succeeding.

The method may be implemented, for example, in a network device or in an end user device. Network devices in which the method can be implemented include an HTTP proxy (e.g., a cloud- or premise—or device-based proxy), a DNS server or proxy (e.g., a cloud- or premise—or device-based DNS server or proxy), a VPN concentrator (either cloud- or device- or premise-based), a network gateway (e.g., carrier or corporate), Wi-Fi access points (public or domestic or corporate). In each case, network traffic from the end user devices or other computing devices to be protected is directed via the network device and the network device operates to detect and block requests to potential phishing entities/servers/websites/webpages, etc.

The end user devices may be any type of computing device but embodiments of the present disclosure are particularly suited to protecting mobile end user devices such as laptop computers, tablet computers and smartphones.

In some embodiments, the method is implemented in the end user devices themselves. The method could operate within the device operating system, for example. Alternatively, the method can be implemented as a plugin to one or more applications installed on the device, for example a web browser application or social media application.

In a third aspect, the disclosure provides a device for detecting a phishing threat, the device comprising:
  a memory storing a pre-defined statistical model to determine whether a network resource is a potential phishing threat based on features extracted from a network resource identifier for the network resource;
  an input interface for receiving a request to access a network resource; and
  a processor for processing the request, the processor configured to:
    determine, from the request, a network resource identifier for the requested network resource;
    extract one or more features from the network resource identifier;
    apply the pre-defined statistical model to the extracted features; and
    classify the network resource as a phishing threat if the output of the statistical model, when applied to the extracted features, determines that the network resource is a potential phishing threat.

In a fourth aspect, the disclosure provides a device for detecting a phishing threat, the device comprising:
  a memory storing a pre-defined statistical model to determine whether a network resource is a potential phishing threat based on features extracted from a network resource identifier for the network resource;
  an input interface for receiving a one or more network resource identifiers; and
  a processor for processing the request, the processor configured to:
    extract one or more features from the or each network resource identifier;
    apply the pre-defined statistical model to the extracted features; and
    for each network resource identifier, classify the associated network resource as a phishing threat if the output of the statistical model, when applied to the extracted features, determines that the network resource is a potential phishing threat.

In a fifth aspect, the disclosure provides a method of training a statistical model for use in the method or the device of the aspects above. The method comprises:

providing an initial statistical model intended to determine whether a network resource is a potential phishing threat based on features extracted from a network resource identifier for the network resource;

providing training data, the training data including:
a plurality of network resource identifiers for known phishing network resources; and
a plurality of network resource identifiers for known non-phishing network resources;

extracting one or more features from the network resource identifier for each of the network resource requests of the training data;

training the model using the extracted features.

The training data may be obtained based on a plurality of network resource requests for known phishing network resources and a plurality of network resource requests for known non-phishing network resources, from which the network resource identifiers for the requested network resources can be determined as an initial step.

The training method of the fifth aspect preferably uses a machine learning algorithm, which operates on the training data to train the model.

The disclosure also provides software that can be installed on a computing device to implement the methods described above.

BRIEF DESCRIPTION OF THE SEVERAL VIEWS OF THE DRAWINGS

Embodiments of the disclosure are described below with reference to the accompanying FIGURE.

FIG. 1 illustrates a process for training and subsequently employing a statistical model for phishing detection, in accordance with an embodiment of the present disclosure.

DETAILED DESCRIPTION

In general terms, embodiments of the disclosure detect phishing by utilizing a number of novel generalized features of malicious phishing website addresses (fully qualified domain names: FQDNs), which are combined using a Machine Learning (ML) approach to produce a statistically reliable method for recognizing malicious entities dynamically, without the need for such entities to be detected manually and published to a list.

The specific features used can be extended or removed as required, but in a preferred embodiment such features may include one or more of:

The FQDN contains one of the target domains but the target domain is not the second level domain. The target domain list is compiled as a list of domains which are associated with high value credentials, e.g., banking, email, social media, corporate extranet, etc.

Character length of the FQDN.
Number of subdomains in the FQDN.
Existence of a selected keyword in FQDN.
Stripped Keyword in FQDN.
Longest subdomain length.
Number of numeric subdomains.
Number of subdomains with hyphen.
Number of alphanumeric subdomains.
Unusual top-level domain (TLD).
The maximum Kulback-Leibler (KL) divergence of each of the subdomains in the FQDN.

Additional features could include the following:
Aspects of the complete URL (not just the FQDN).
Geographical lookup based on the IP address(es) to which the FQDN resolves.

In an embodiment, the Random Forest algorithm is used to combine multiple features (e.g., multiple features selected from those listed above) for historical data in such a way to minimize the likelihood of future predictions being incorrect. This algorithm was chosen due to its well-known properties of being very good at generalizing to any new data it is shown.

One specific implementation of the Random Forest algorithm that can be used is a variation on the original Breiman algorithm available from the open source sci-kit learn project[1].

[1] http://scikit-learn.org/stable/modules/generated/sklearn.ensemble.RandomForestClassifier.html#sklearn.ensemble.RandomForestClassifier As illustrated schematically in FIG. 1, the model is produced in a training environment by analyzing the feature set from a wide range of known malicious (i.e., phishing) and benign ('Trusted,' i.e., non-phishing) FQDNs, and progressively adjusting the model so that unseen FQDNs are correctly classified as malicious or benign with a high degree of accuracy.

The resultant statistical model can be encoded using a range of data representation techniques and transferred to a range of different embodiments designed to detect and, optionally, prevent access to malicious phishing websites.

In an embodiment, the industry standard Predictive Model Markup Language (PMML) is used to encode and transfer the statistical model for use in a RESTful API.

The model is deployed into a runtime environment where new potentially malicious FQDNs are processed to provide dynamic detection of malicious phishing websites. New FQDNs are processed to extract the same set of features as were used in training the model; the resultant feature set then being processed by the model to determine the probability that the FQDN is that of a malicious phishing website, as illustrated schematically in FIG. 1.

In a preferred embodiment, the runtime context into which the trained model is deployed is within a cloud-based HTTP proxy and provides protection to many mobile devices (including smartphones and laptops), which are configured to direct their HTTP traffic through the proxy. The FQDN of each HTTP request passing through the proxy is processed to extract the feature set, which is then processed by the model to determine the probability that the FQDN is that of a malicious phishing website. If the probability exceeds a certain confidence threshold, the HTTP proxy is instructed to block the request, thereby preventing the delivery of a malicious phishing webpage to the end-user and potential subsequent exfiltration of sensitive data.

In an alternative embodiment, the trained model is deployed into a DNS server and provides protection to many mobile devices (e.g., smartphones and laptops), which are configured to direct their DNS requests to the DNS server. Each DNS request passing through the proxy is processed to extract the feature set, which is then processed by the model to determine the probability that the domain name is a malicious phishing domain. If the probability exceeds a certain confidence threshold, the DNS server is instructed to block the DNS lookup, either by responding with "not found," or by responding with an invalid or benign IP address, thereby preventing the application making the DNS request from accessing the malicious IP and preventing the potential subsequent exfiltration of sensitive data.

In a further alternative embodiment, the trained model is deployed directly to a multiplicity of end user devices (e.g., smartphone, laptop) and operates within the device operating system as an operating system plugin or filter or local proxy or server or as a plugin to one or more applications (e.g., web browser, social media app, etc.). In each case, the model is deployed such that each DNS lookup or network request is processed to extract the feature set from the FQDN, which is then processed by the model to determine the probability that the FQDN is a malicious phishing domain. If the probability exceeds a certain confidence threshold, then access to the malicious resource is denied, thereby preventing the potential subsequent exfiltration of sensitive data.

Other embodiments include cloud- or premise-based VPN concentrators, carrier network gateways, corporate network gateways, public Wi-Fi access points, domestic Wi-Fi access points and feeds or databases of security certificate registrations or domain name registrations.

Since the techniques used to generate phishing FQDNs will change over time, it will generally be important in embodiments of the disclosure that both the trained model and the set of extracted features are updated regularly.

The model may be updated whenever there is a material change in either or both of the 'Known Phishing FQDNs Dataset' or the 'Known Trusted FQDNs Dataset.' Retraining can also occur at regular intervals regardless of the extent of the change in either dataset. Retraining with altered datasets will produce a new model with improved efficacy in classifying unseen FQDNs. This updated model should be published to one or more runtime environments where it can detect malicious FQDNs with greater accuracy.

From time to time, it may also be desirable to include additional features in the feature extraction process if these are believed to improve the accuracy of the detection process. Similarly, certain features may be removed from the feature extraction process if they are deemed to no longer be valuable in improving the accuracy of the detection process. In either case, the model will need to be retrained and updated in the same manner as described above. Moreover, the feature extraction process must be amended in both the training environment and runtime environments to reflect the added/removed features. However, the need to synchronize these updates precisely may be somewhat mitigated by allowing both the training and evaluation phases to substitute default values when certain features are absent from the supplied data.

Various modification and additions can be made to the specific examples described above without departing from the spirit and scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method of detecting a phishing threat, the method using a pre-defined statistical model to determine whether a network resource is a potential phishing threat based on features extracted from a network resource identifier for the network resource, the method comprising:
   receiving a request to access a network resource;
   determining, from the request, a network resource identifier for the requested network resource;
   extracting one or more features from the network resource identifier;
   applying the pre-defined statistical model to the extracted one or more features, wherein an output of the pre-defined statistical model determines a probability that a network resource is a phishing threat;
   classifying the network resource as a phishing threat if the output of the pre-defined statistical model, when applied to the extracted one or more features, determines that the network resource is a potential phishing threat when the probability exceeds a predetermined threshold;
   responding, in response to determining that the network resource is a potential phishing threat, to the request with one of an invalid IP address and a benign IP address; and
   prior to receiving a subsequent request to access another network resource, updating an extraction process for extracting one or more features from a subsequent network resource identifier from the subsequent request with substitute default values.

2. The method of claim 1, further comprising preventing access to the network resource if it is classified as a phishing threat.

3. The method of claim 1, wherein the step of extracting one or more features from the network resource identifier comprises extracting features from an FQDN portion of the network resource identifier.

4. The method of claim 1, wherein the step of extracting one or more features from the network resource identifier comprises extracting a feature indirectly from the network resource identifier.

5. The method of claim 1, wherein the pre-defined statistical model is applied to a set of at least three features extracted from the network resource identifier.

6. The method of claim 1, wherein the pre-defined statistical model is applied to a set of at least five features extracted from the network resource identifier.

7. The method of claim 1, wherein the extracted one or more features of the network resource identifier comprise features selected from:
   the FQDN containing a target domain from a pre-defined list of target domains but the target domain is not the second level domain;
   character length of the FQDN;
   number of subdomains in the FQDN;
   existence of a selected keyword in FQDN;
   stripped Keyword in FQDN;
   longest subdomain length;
   number of numeric subdomains;
   number of subdomains with hyphen;
   number of alphanumeric subdomains;
   unusual top-level domain (TLD);
   the maximum Kulback-Leibler (KL) divergence of each of the subdomains in the FQDN; and a geographical lookup based on the IP address(es) to which the FQDN resolves.

8. The method according to claim 1 implemented in an HTTP proxy, wherein the received request for a network resource is an HTTP request, wherein in the case when the requested network resource is determined to be a potential phishing threat, the HTTP proxy is instructed to block the HTTP request.

9. The method according to claim 1, implemented in a DNS server, the received request for a network resource being a DNS lookup, wherein in the case when a network resource is determined to be a potential phishing threat, the DNS server is instructed to block the DNS lookup.

10. The method according to claim 1, implemented in an end user device, wherein in the case when a network resource is determined to be a potential phishing threat, the end user device blocks the request for the network resource.

11. A device for detecting a phishing threat, the device comprising:
a memory storing a pre-defined statistical model to determine whether a network resource is a potential phishing threat based on features extracted from a network resource identifier for the network resource;
an input interface for receiving a request to access a network resource; and
a processor for processing the request, the processor configured to:
determine, from the request, a network resource identifier for the requested network resource;
extract one or more features from the network resource identifier;
apply the pre-defined statistical model to the extracted one or more features, wherein an output of the pre-defined statistical model determines a probability that a network resource is a phishing threat;
classify the network resource as a phishing threat if the output of the pre-defined statistical model, when applied to the extracted one or more features, determines that the network resource is a potential phishing threat when the probability exceeds a predetermined threshold;
respond, in response to determining that the network resource is a potential phishing threat, to the request with one of an invalid IP address and a benign IP address; and
prior to receiving a subsequent request to access another network resource, update an extraction process for extracting one or more features from a subsequent network resource identifier from the subsequent request with substitute default values.

12. The device of claim 11, further comprising an output interface for forwarding or responding to the request to access the network resource, the device configured only to forward or respond to the request in the case where the network resource is not classified as a phishing threat.

13. The device of claim 11, wherein the features of the network resource identifier comprise features selected from:
the FQDN containing a target domain from a pre-defined list of target domains but the target domain is not the second level domain;
character length of the FQDN;
number of subdomains in the FQDN;
existence of a selected keyword in FQDN;
stripped Keyword in FQDN;
longest subdomain length;
number of numeric subdomains;
number of subdomains with hyphen;
number of alphanumeric subdomains;
unusual top-level domain (TLD);
the maximum Kulback-Leibler (KL) divergence of each of the subdomains in the FQDN; and
a geographical lookup based on the IP address(es) to which the FQDN resolves.

14. The device of claim 11, wherein the device is an HTTP proxy, the received request for a network resource being an HTTP request, wherein in the case when a network resource is determined to be a potential phishing threat, the HTTP proxy acts to block the HTTP request.

15. The device of claim 11, wherein the device is a DNS server, the received request for a network resource being a DNS lookup, wherein in the case when a network resource is determined to be a potential phishing threat, the DNS server acts to block the DNS lookup.

16. The device of claim 11, wherein the device is an end user device, wherein in the case when a network resource is determined to be a potential phishing threat, the end user device blocks the request for the network resource.

17. A method of determining whether one or more network resources are phishing threats, each one or more network resources having an associated network resource identifier, the method using a pre-defined statistical model to determine whether a network resource is a potential phishing threat based on features extracted from the network resource identifier, the method comprising:
receiving, from a database, one or more network resource identifiers;
extracting one or more features from each network resource identifier;
applying the pre-defined statistical model to the extracted one or more features, wherein an output of the pre-defined statistical model determines a probability that a network resource is a phishing threat;
for each network resource identifier, classifying the associated network resource as a phishing threat if the output of the pre-defined statistical model, when applied to the extracted one or more features, determines that the network resource is a potential phishing threat when the probability exceeds a predetermined threshold; and
prior to receiving a subsequent request to access another network resource, updating an extraction process for extracting one or more features from a subsequent network resource identifier from the subsequent request with substitute default values.

18. A device for detecting a phishing threat, the device comprising:
a memory storing a pre-defined statistical model to determine whether a network resource is a potential phishing threat based on features extracted from a network resource identifier for the network resource;
an input interface for receiving, from a database, one or more network resource identifiers; and
a processor for processing the request, the processor configured to:
extract one or more features from each network resource identifier;
apply the pre-defined statistical model to the extracted one or more features, wherein an output of the pre-defined statistical model determines a probability that a network resource is a phishing threat;
for each network resource identifier, classify the associated network resource as a phishing threat if the output of the pre-defined statistical model, when applied to the extracted one or more features, determines that the network resource is a potential phishing threat when the probability exceeds a predetermined threshold; and prior to receiving a subsequent request to access another network resource, update an extraction process for extracting one or more features from a subsequent network resource identifier from the subsequent request with substitute default values.

* * * * *